United States Patent [19]

Bernhardt, Jr.

[11] 3,845,892

[45] Nov. 5, 1974

[54] BICYCLE SAFETY SEAT FOR CHILD

[76] Inventor: William F. Bernhardt, Jr., 7 Strang Rd., Tewksbury, Mass. 01876

[22] Filed: May 15, 1972

[21] Appl. No.: 253,062

[52] U.S. Cl. ............... 224/36, 280/202, 297/390
[51] Int. Cl. .............................. B62j 7/06
[58] Field of Search ........... 224/36, 30 A, 32 R; 297/390, 384; 280/202, 289

[56] References Cited
UNITED STATES PATENTS

| | | | |
|---|---|---|---|
| 664,542 | 12/1900 | Firnhaber | 297/390 X |
| 2,563,679 | 8/1951 | Hardy | 224/36 |
| 2,649,893 | 8/1953 | Spriggs | 297/390 X |
| 2,664,150 | 12/1953 | Byrne | 297/390 |
| 2,700,493 | 1/1955 | Meier | 224/36 |
| 2,776,700 | 1/1957 | Potter et al. | 297/3 |
| 2,810,428 | 10/1957 | Plese | 297/390 X |
| 3,065,028 | 11/1962 | Irion | 297/390 |

FOREIGN PATENTS OR APPLICATIONS

| | | | |
|---|---|---|---|
| 384,335 | 1907 | France | 280/202 |

*Primary Examiner*—Robert J. Spar
*Assistant Examiner*—Jerold M. Forsberg
*Attorney, Agent, or Firm*—Joseph S. Iandiorio

[57] ABSTRACT

A safety seat for a child for mounting on a bicycle including a firm, solid raised back portion, a firm, solid seat portion connected to the raised back portion and two side arm portions connected to both the back and seat portions, a leg stock front piece releasably engaged with the seat portion and the arm portions, means for engaging the leg stock front piece with the arm and seat portions, means for securing the leg stock front piece in position relative to the arm and seat portions, a pair of clamps fastened to the back portion in spaced relation to each other for securing the seat to the handlebars of the bicycle, a pair of pivot supports mounted on the bottom of the seat portion and a pair of struts pivotally attached to the pivot supports at one end and adapted at the other end for engagement with the front axle of the bicycle.

4 Claims, 5 Drawing Figures

PATENTED NOV 5 1974 3,845,892

BICYCLE SAFETY SEAT FOR CHILD

FIELD OF INVENTION

This invention relates to a bicycle safety seat for carrying a child.

BACKGROUND OF INVENTION

There are a number of different seats designed for carrying children on bicycles. Some of these seats are rather weak and insubstantial. Others are designed for mounting behind the rider, i.e., over the rear fender so that the rider has great difficulty in observing the child. No matter how fool proof such seats may be there is no guarantee that they can withstand repeated probings by nimble little fingers driven by curiosity to explore. In addition it is unnerving for the rider no matter how good the seat may be to be unable to watch the child. Seats designed for use at the front of the bicycle are generally more like a basket than a seat and are stiff, uncomfortable and ill adapted for safely carrying a child. One particular basket-like seat, U.S. Pat. No. 556,951 is constructed using a wire mesh and has two spring-like hooks which engage the handlebar. However the seat is inside the handlebars, between the rider and handlebars where it can be a nuisance and a hazard to operating the bicycle. In addition the hooks simply hang on the handlebars; they do not grip them, and an extension from the bottom of the seat rests against the handle part for support. Conventional seats also use various devices to hold in the child but these are available to be fiddled with by the child who may succeed in releasing himself given enough time, sufficient time possibly being available when the child is behind the rider where he cannot be continually observed. Often these devices do not consider the problem of getting a fully dressed child in the seat easily, yet firmly securing him once he is in it.

SUMMARY OF INVENTION

It is therefore an object of this invention to provide an improved child's seat for a bicycle which is sturdy in construction, is firmly mounted to the bicycle in the area in front of the rider where the child can be easily continuously observed and yet not interfere with operation of the bicycle, is comfortable for the child, is easy to install the child in even when he is fully and bulkily dressed, yet safely and securely holds the child in place once he has been loaded into the seat, and can be made difficult to open by the child.

The invention features a safety seat for a child for mounting on a bicycle including a firm, solid raised back portion, a firm, solid seat portion connected to that raised back portion and two side arm portions connected to both the back and seat portions. A leg stock front piece is releasably engaged with the seat portion and arm portions and there are means for engaging the leg stock front piece with the arms and seat portions and means for securing the leg stock front piece in position relative to the arm and seat portions. A pair of clamps mounted on the back portion in spaced relation to each other secure the seat to the handlebars of the bicycle. There are a pair of pivot supports mounted on the bottom of the seat portion and a pair of struts pivotally attached to the pivot supports at one end and adapted at their other end for engagement with the front axle of the bicycle.

DISCLOSURE OF PREFERRED EMBODIMENT

Other objects, features and advantages will occur from the following description of a preferred embodiment and the accompanying drawings, in which.

Figure 1:
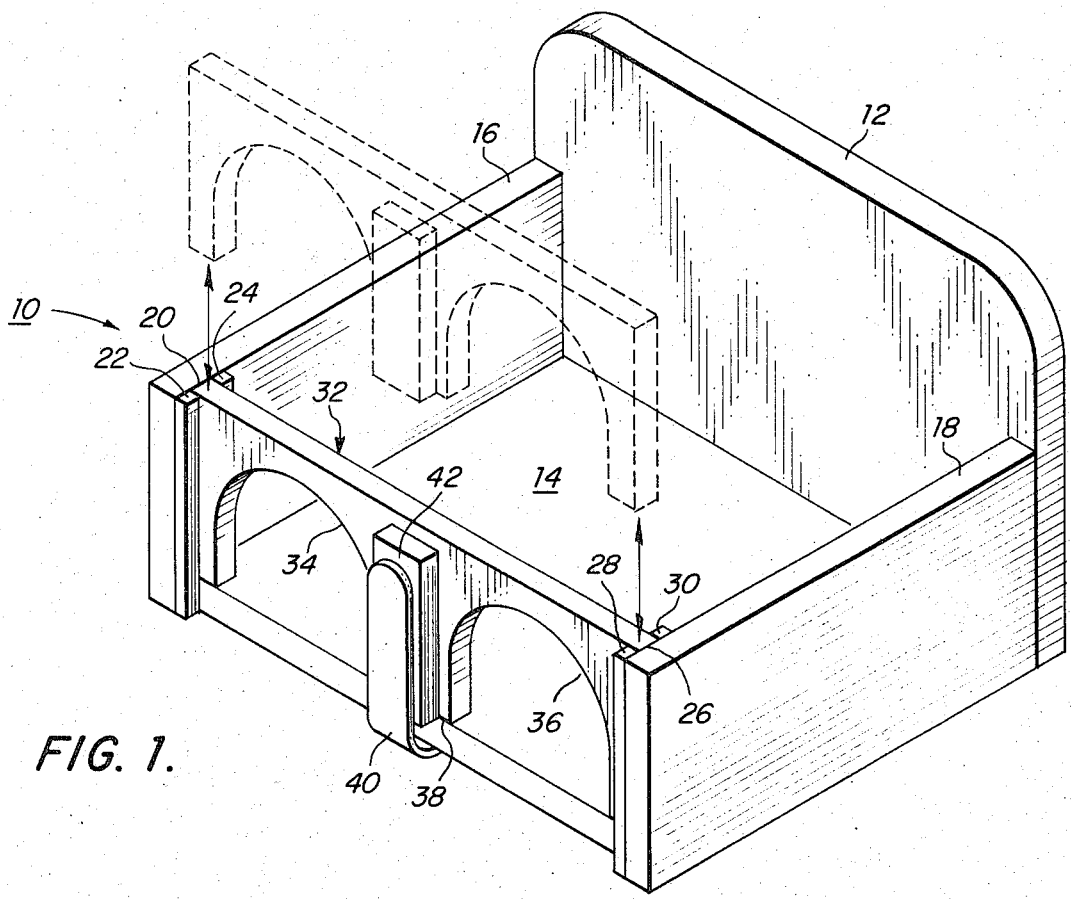
FIG. 1 is an axonometric view of a safety seat according to this invention.

There is shown in FIG. 1 a safety seat 10 for a child including a firm, solid raised back portion 12, a firm, solid seat portion 14 connected to the raised back portion and two arm portions 16 and 18 fastened to the back portion 12 and seat portion 14. A vertical groove or channel 20 is formed at the forward end of arm portion 16 by means of two spaced rails 22 and 24 fastened to arm portion 16. A similar vertical groove or channel 26 is formed at the forward portion of arm 18 by spaced rails 28 and 30, respectively. The connection between back portion 12 and seat portion 14 and between arm portions 16 and 18 and back portion 12 and seat portion 14 and between rails 22, 24, 28 and 30 and their respective arm portions may be made by means of interlocking shapes, screws, nails, glue or like means. Releasably engaged in channels 20 and 26 is a leg stock 32 having two openings therethrough 34 and 36 to accommodate the legs of the child. Openings 34 and 36 extend fully to the lower edge 38 of leg stock 32 to enable the stock to be clamped down over the child's legs after the child has been placed in the seat. Once in position leg stock 32 is secured by a leather strap 40 fastened to back plate 42 on the front of leg stock 32 between openings 34 and 36. Strap 40 extends down, around, and beneath seat portion 14, FIG. 2, and fastens by means of a snap fastener 44, for example, having one portion 46 fastened to the bottom of seat portion 14 and the other portion 48 fastened to the end of leather strap 40. Leather strap 40 may be fastened to back plate 42 and back plate 42 may be fastened to leg stock 32 by any suitable means such as discussed supra. The use of strap 40 to secure leg stock 32 in position provides the means whereby leg stock 32 may be easily removed and replaced when installing the child in seat 10 or when removing him from it while also placing the fastening means outside of the reach of the child beneath and under seat portion 14 so that he cannot reach it and inadvertantly release it. For increased protection against intervention by the child and to improve the visibility of the fastener for the rider strap 40 may be extended as shown in phantom at 40' and fastened on the back portion 12 by means of fastener 44'.

Figure 2:
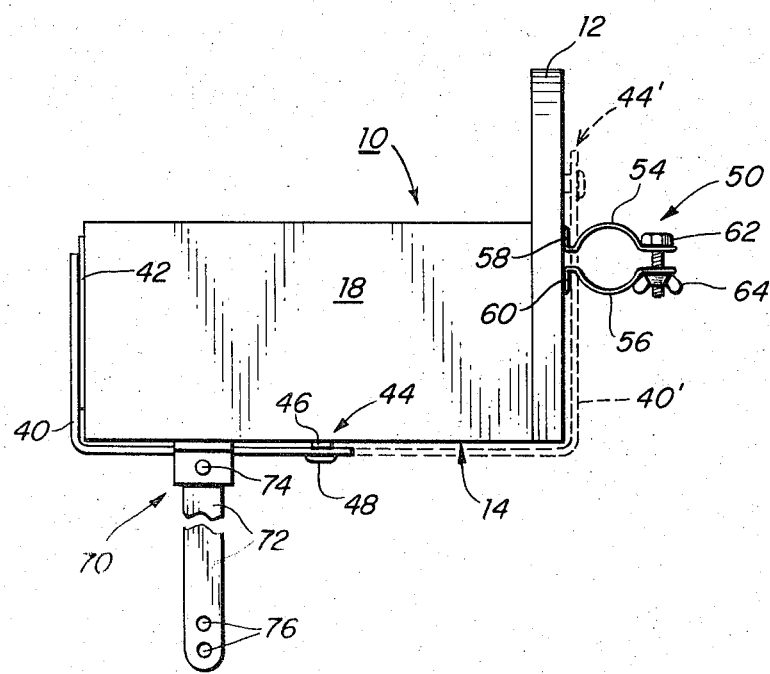
FIG. 2 is a side elevational view of the seat of FIG. 1.
Figure 3:
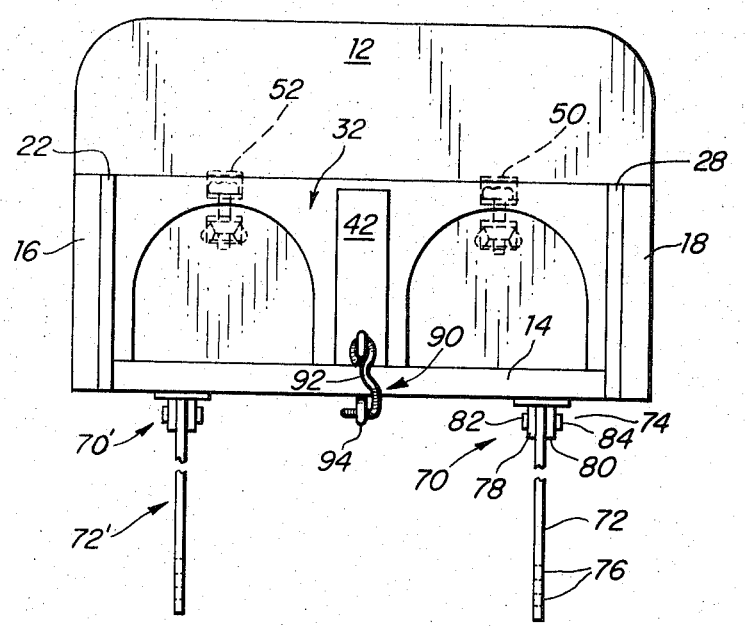
FIG. 3 is a front elevational view of the seat of FIG. 1 showing a different securing means.

A pair of clamps 50, 52 FIGS. 2 and 3 are provided for mounting seat 10 to the handlebars of a bicycle. Each of clamps 50 and 52, exemplified by clamp 50 in FIG. 2, includes two U-shaped members 54 and 56 having flat vertical portions 58 and 60 which may be mounted by means of screws to the back of back portion 12. The other ends of members 54 and 56 contain holes through which is mounted a bolt 62 which receives at its lower end a butterfly nut 64. The butterfly nut 64 and bolt 62 are removed to enable the seat to be initially placed on the handlebars; then bolt 62 is replaced and butterfly nut 64 is threaded on and screwed up tight on bolt 62 to make a tight secure grip on the handlebar. In addition to spaced clamps 50 and 52, FIG. 3, there are second means which are provided to support seat 10, FIG. 2. Pivot member 70 is fastened to the under side of seat portion 14 by means of screws or other fastening devices and engages strut 72 by means of pin 74. Strut 72 includes one or more holes 76 at its lower end for engaging the front axle of the bicycle. Pivot member 70 includes two spaced vertical walls 78 and 80 between which strut 72 is slidably received and pivotally held in position by means of pin 74 whose ends 82 and 84 are flattened to maintain it in position. A matching pivot 70' and strut 72' is mounted in spaced relation from pivot member 70 on the underside of seat portion 14.

Figure 4:
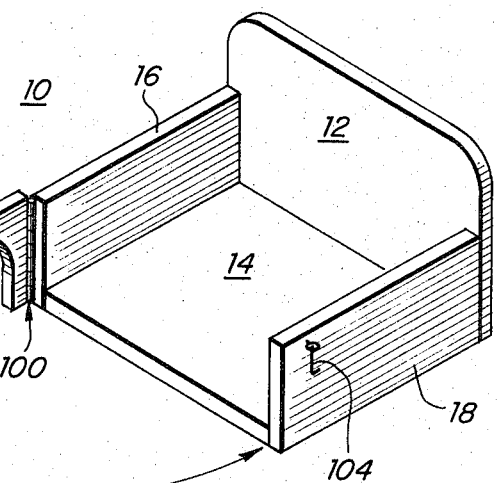
FIG. 4 is an axonometric view of the safety seat according to this invention using alternative means for releasably engaging the leg stock with the rest of the seat.
Figure 5:
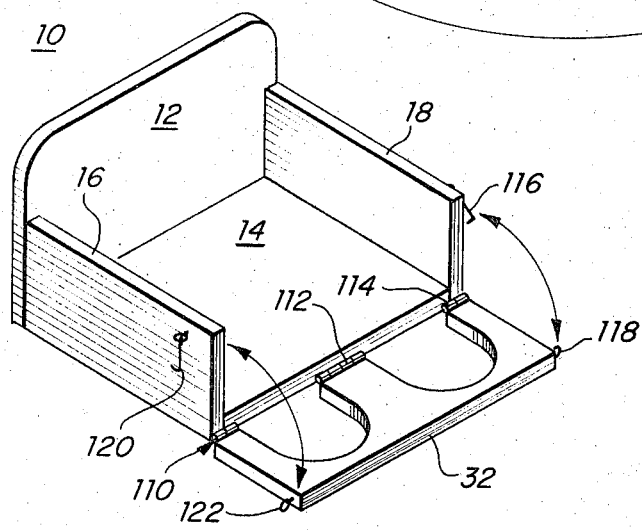
FIG. 5 is an axonometric view of a safety seat according to this invention showing another alternative means for releasably engaging the leg stock with the rest of the seat.

Alternatively, instead of strap 40, FIGS. 1 and 2, a hook and eye 90, FIG. 3, including a right angle hook 92 and an eye 94 mounted on the under side of seat portion 14 may be used to secure the leg stock in position. While hook and eye assembly 90 provides some protection against inadvertant opening of the leg stock by the child because of the extension of right angle hook 92 around and beneath seat portion 14, even greater protection may be obtained by extending the back plate 42 as far as or even beyond the under side of seat portion 14 and fastening the hook and eye assembly either to the bottom or the back portion of the back plate 42. Alternatively, FIG. 4, seat 10 may include a hinge 100 positioned along a vertical edge of leg stock 32 and interconnecting it with the forward edge of arm portion 16. A hook and eye assembly consisting of an eye 102 on the other end of leg stock 32 and a hook 104 mounted on the outside of arm 18 may be provided to enable the leg stock 32 to be swung out of the way while the child is entered or removed from seat 10. In another alternative form, FIG. 5, there may be provided three hinges 110, 112 and 114 along the lower edge of leg stock 32 and two hook and eye assemblies may be provided one adjacent arm 18 including hook 116 and eye 118 and one adjacent arm portion 16 including hook 120 and eye 122.

Other embodiments will occur to those skilled in the art and are within the following claims:

What is claimed is:

1. A child safety seat for mounting on a bicycle comprising a raised back portion, a seat portion connected to said raised back portion, two side arm portions connected to both said back and seat portions, a monolithic leg stock front piece having separate leg apertures and being releasably engagable with said seat portion and arm portions, means for slidably engaging said leg stock front piece with said arm and seat portions, means for securing said leg stock front piece in position relative to said arm and seat portions including a strap fixed to said leg stock front piece and extending beneath said seat portion and being releasably attachable to at least one of said seat and back portions; a pair of clamps fastened to said back portion in spaced relation to each other for securing said seat to the handlebars of the bicycle, a pair of spaced pivot supports mounted on the bottom of said seat portion and a pair of struts pivotally attached to said pivot supports at one end and adapted at the other end for engagement with the front axle of the bicycle, said leg stock front piece being movable upon release of said strap to permit a child to be installed in or removed from said seat.

2. The safety seat of claim 1 in which said means for engaging includes a vertical track proximate the forward end of each said arm portion for slidably engaging said leg stock front piece and permitting it to be moved vertically upward and out of said tracks.

3. The safety seat of claim 2 in which said means for securing includes a flexible strap permanently mounted to said leg stock and releasably secured to the remaining portions of the seat out of the reach of the child occupant of the seat.

4. The child safety seat of claim 1 in which said means for engaging include hinge means disposed along the lower edge of said leg stock front piece hingeably connecting said leg stock front piece with said seat portion.

* * * * *